United States Patent
Fernandez et al.

(10) Patent No.: US 9,484,015 B2
(45) Date of Patent: Nov. 1, 2016

(54) HYBRID PREDICTIVE MODEL FOR ENHANCING PROSODIC EXPRESSIVENESS

(71) Applicant: INTERNATIONAL BUSINESS MACHINES CORPORATION, Armonk, NY (US)

(72) Inventors: Raul Fernandez, New York, NY (US); Asaf Rendel, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 14/012,759

(22) Filed: Aug. 28, 2013

(65) Prior Publication Data

US 2014/0358546 A1     Dec. 4, 2014

Related U.S. Application Data

(60) Provisional application No. 61/828,094, filed on May 28, 2013.

(51) Int. Cl.
   *G10L 13/00*        (2006.01)
   *G10L 13/10*        (2013.01)

(52) U.S. Cl.
   CPC ...................... *G10L 13/10* (2013.01)

(58) Field of Classification Search
   USPC ................................. 704/257–262
   See application file for complete search history.

(56) References Cited

U.S. PATENT DOCUMENTS

| | | | |
|---|---|---|---|
| 8,224,652 B2* | 7/2012 | Wang et al. ................. | 704/275 |
| 8,401,849 B2* | 3/2013 | Chandra et al. ............ | 704/235 |
| 2006/0259303 A1* | 11/2006 | Bakis .......................... | 704/268 |
| 2008/0147405 A1* | 6/2008 | Qing ....................... | G10L 13/10 704/258 |
| 2010/0082345 A1* | 4/2010 | Wang et al. ................. | 704/260 |
| 2013/0066631 A1* | 3/2013 | Wu .......................... | G10L 13/08 704/258 |
| 2014/0114655 A1* | 4/2014 | Kalinli-Akbacak ......... | 704/231 |

OTHER PUBLICATIONS

Henter, G., et al. "Gaussian Process Dynamical Models for Nonparametric Speech Representation and Synthesis" 2012 IEEE International Conference on Acoustics, Speech and Signal Processing, ICASSP 2012. Mar. 2012. (4 Pages).

Hinton, G. "A Practical Guide to Training Restricted Boltzmann Machines" University of Toronto Department of Computer Science. Aug. 2010. (21 Pages).

Hinton, G., et al. "A Fast Learning Algorithm for Deep Belief Nets" Neural Computation. vol. 18, No. 1. Jan. 2006. (16 Pages).

Park, H., et al. "Gaussian Process Dynamical Models for Phoneme Classification" NIPS Workshop on Bayesian Nonparametrics. 2011. (2 Pages).

Pilkington, N., et al. "Gaussian Process Experts for Voice Conversion" 12th Annual Conference of the International Speech Communication Association. Aug. 2011. pp. 1-4.

(Continued)

*Primary Examiner* — Leonard Saint Cyr
(74) *Attorney, Agent, or Firm* — Tutunjian & Bitetto, P.C.; Kevin Jordan

(57) ABSTRACT

Systems and methods for prosody prediction include extracting features from runtime data using a parametric model. The features from runtime data are compared with features from training data using an exemplar-based model to predict prosody of the runtime data. The features from the training data are paired with exemplars from the training data and stored on a computer readable storage medium.

17 Claims, 4 Drawing Sheets

(56) References Cited

OTHER PUBLICATIONS

Quiñonero, J. et al. "A Unifying View of Sparse Approximate Gaussian Process Regression" The Journal of Machine Learning Research. vol. 6. Dec. 2005. pp. 1939-1959.
Rasmussen, C., et al. "Gaussian Processes for Machine Learning" MIT Press, 2006. (266 Pages).
Sainath, T., et al. "Making Deep Belief Networks Effective for Large Vocabulary Continuous Speech Recognition" 2011 IEEE Workshop on Automatic Speech Recognition & Understanding, ASRU 2011. Dec. 2011. (6 Pages).
Sakuri, A., et al. "Generation of F0 Contours Using a Model-Constrained Data-Driven Method" 2001 IEEE International Conference on Acoustics, Speech, and Signal Processing, 2001 (ICASSP '01). vol. 2. May 2001. (4 Pages).
"HMM-Based Speech Synthesis System (HTS)" <http://hts.sp.nitech.ac.jp/> Aug. 2013.

Salakhutdinov, R., et al. "Using Deep Belief Nets to Learn Covariance Kernels for Gaussian Processes" Proceedings of the Twenty-First Annual Conference on Neural Information Processing Systems. Dec. 2007. pp. 1-8.
Tokuda, K., et al. "Speech Parameter Generation Algorithms for HMM-Based Speech Synthesis" 2000 IEEE International Conference on Acoustics, Speech, and Signal Processing. Jun. 2000. (4 Pages).
Vishnubhotla, S., et al. "An Autoencoder Neural-Network Based Low-Dimensionality Approach to Excitation Modeling for HMM-Based Text-To-Speech" Proceedings of the IEEE International Conference on Acoustics, Speech, and Signal Processing. Mar. 2010. (4 Pages).
Yamagishi, J., et al. "Speaker-Independent HMM-Based Speech Synthesis System—HTS-2007 System for the Blizzard Challenge 2007" Proceedings of the IEEE International Conference on Acoustics, Speech, and Signal Processing. Mar. 2008. (6 Pages).

\* cited by examiner

400

Training a hybrid model for prosody prediction
402

Training a parametric model to transform training data to training targets
404

Extracting deep layer features from the training data using the parametric model
406

Training an exemplar-based model to determine exemplars from the training data
408

Pairing the exemplars with the deep layer features of the training data in an exemplar database
410

Predicting prosody of runtime data using the trained hybrid model
412

Processing runtime data using the parametric model to determine deep layer features of the runtime data
414

Comparing the deep layer feature of the runtime data with the deep layer features of the training data using the exemplar-based model to predict prosody of the runtime data
416

FIG. 4

HYBRID PREDICTIVE MODEL FOR ENHANCING PROSODIC EXPRESSIVENESS

RELATED APPLICATION INFORMATION

This application claims priority to provisional application Ser. No. 61/828,094 filed on May 28, 2013, incorporated herein by reference in its entirety.

BACKGROUND

1. Technical Field

The present invention relates to speech synthesis, and more particularly to a hybrid parametric/exemplar-based predictive model for enhancing prosodic expressiveness for speech synthesis.

2. Description of the Related Art

Prosody is an inherent feature of spoken languages realized by the pitch, stress duration and other features in speech. Data-driven speech synthesis systems can be broadly contrasted in terms of the ways in which they make use of the data during the learning and run-time stages of the process to infer and predict prosodic properties of the acoustic waveform. For unit-selection systems, typical architectures exploit prosodic models to generate desired target values to use as a component of the cost function driving the unit search. At the other end of the continuum, fully parametric, model-based systems use training data only during the learning stage to adapt the model parameters and then use the models at run-time to generate prosodic parameters that can be used directly in the speech-generation stage. Since the data plays no further role after training, these systems incur a small footprint size, which is one of their desirable properties.

Fully parametric model-based systems usually rely on statistical averaging, leading to predicted prosody that suffers from low prosodic expressiveness due to flat intonation. On the other hand, exemplar-based models tend to be more expressive, but less robust, because their selection is based on low-level features or high-dimensional features.

SUMMARY

A method for prosody prediction includes extracting features from runtime data using a parametric model. The features from runtime data are compared with features from training data using an exemplar-based model to predict prosody of the runtime data. The features from the training data are paired with exemplars from the training data and stored on a computer readable storage medium.

A system for prosody prediction includes a parametric model configured to extract features from runtime data. An exemplar-based model is configured to compare the features from runtime data with features from training data to predict prosody of the runtime data. The features from the training data are paired with exemplars from the training data and stored on a computer readable storage medium.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a block/flow diagram showing a method for prosody prediction, in accordance with one illustrative embodiment.

DETAILED DESCRIPTION OF PREFERRED EMBODIMENTS

Figure 1:
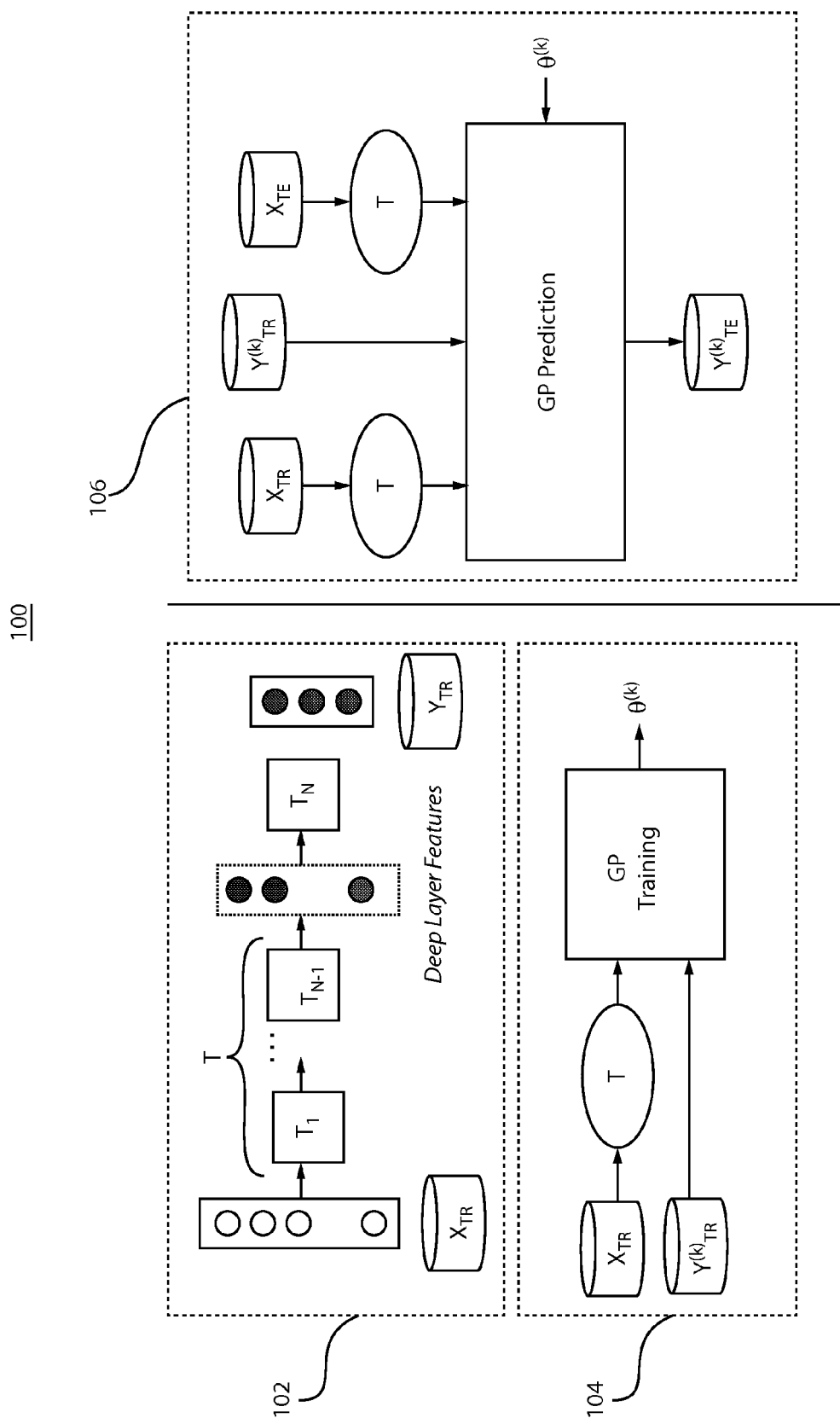
FIG. 1 is a high-level overview of the hybrid predictive model, in accordance with one illustrative embodiment.

In accordance with embodiments of the present invention, systems and methods for enhancing prosodic expressiveness using a hybrid predictive model are provided. The present invention combines the strengths of parametric models and exemplar-based models within a single hybrid model while alleviating their weaknesses. The parametric model component is first used to extract high-level structures from the input data and to summarize such structures succinctly in the form of parameters. The parameters are paired with exemplars from the exemplar-based model to form a database of exemplars. At runtime, the database of exemplars may be exploited to predict new runtime outputs based on the relevance or similarity of the runtime inputs to the exemplar database.

Embodiments of the present invention may be used for prosody prediction in a speech synthesis system, where fully parametric systems by themselves are known to fall short of replicating the full range of expressiveness observed in natural data. The additional use of exemplars enhances this shortcoming. Conversely, the use of the parametric component enhances the exemplar-based prediction since the latter now relies on the high-level structure extracted by the parametric model rather than on the raw inputs.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a high-level overview of a hybrid predictive model 100 for prosody prediction is illustratively depicted in accordance with one illustrative embodiment. The hybrid model 100 includes a parametric model 102 and an exemplar-based model 104. In one embodiment, the parametric model 102 includes a neural network (NN) model and the exemplar-based model 104 includes a Gaussian process (GP). The hybrid model 100 is first trained using training data, then employed for prosody prediction of runtime data using based on the training.

The parametric model 102 is first trained to apply transformations T to training data $X_{TR}$ to reproduce training target $Y_{TR}$. Additionally, the parametric model 102 extracts high-level structures from the input and to summarize such structures succinctly in the form of features. The features may include deep layer features extracted by transforming the data up to the layer of the parametric model 102 before the output.

The exemplar-based model 104 receives transformed training data $X_{TR}$ and training targets $Y(k)_{TR}$ to determine exemplars from the training data. The transformations applied to the training data $X_{TR}$, represented as transformations T in FIG. 1, refer to parametric transformations up to the layer before the output to provide the features (e.g., deep layer features). The exemplars are paired with the features extracted by the parametric model 102 and stored in an exemplar database.

At runtime, the runtime module 106 employs the trained parametric model 102 and trained exemplar-based model 104. Runtime data $X_{TE}$ is first transformed to extract runtime features (e.g., deep layer features). Runtime outputs $Y(k)_{TE}$ are predicted based on a relevance between the runtime features and training features paired with exemplars as determined by the exemplar-based model 104.

Figure 2:
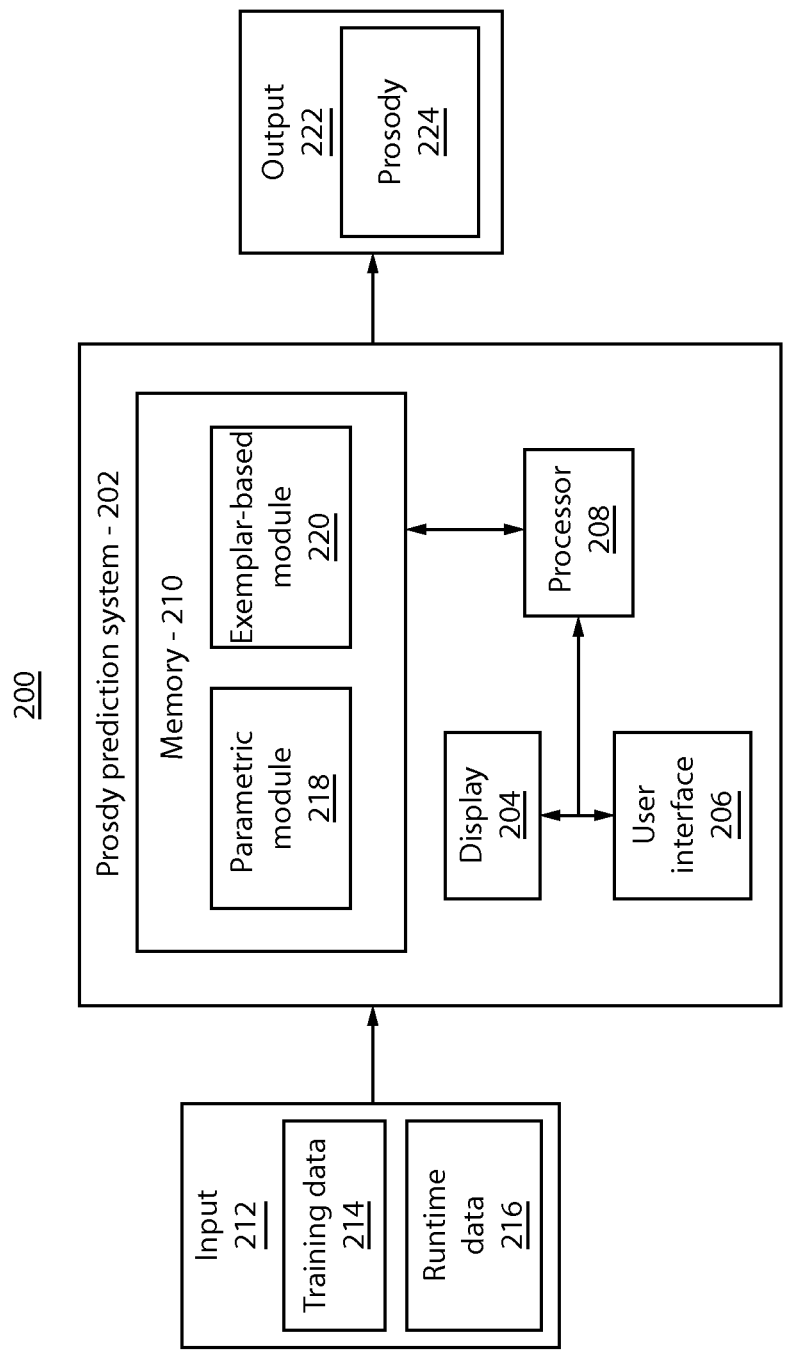
FIG. 2 is a block/flow diagram showing a system for prosody prediction, in accordance with one illustrative embodiment.

Referring now to FIG. 2, a block/flow diagram showing a system for prosody prediction 200 is illustratively depicted in accordance with one embodiment. The system 200 combines the relative strengths of both parametric and exemplar-based predictive approaches within a single hybrid model. The system 200 includes a parametric module 218 and exemplar-based module 220. The parametric module 218 includes a fixed-size model whose size depends on the number of parameters. The exemplar-based module 220 includes a database of exemplars as large as the available training set, which can be trimmed to fit memory requirements. The hybrid model is first trained using training data. At runtime, the parametric module 218 and the exemplar-based module 220 are employed based on the training for the prosody prediction (e.g., the fundamental frequency (F0) contour). The F0 contour represents intonation in speech, which can communicate speaker intent and linguistic cues for speech perception.

The system 200 may include a system or workstation 202. The system 202 preferably includes one or more processors 208 and memory 210 for storing applications, modules and other data. The system 202 may also include one or more displays 204 for viewing. The displays 204 may permit a user to interact with the system 202 and its components and functions. This may be further facilitated by a user interface 206, which may include a mouse, joystick, or any other peripheral or control to permit user interaction with the system 202 and/or its devices. It should be understood that the components and functions of the system 202 may be integrated into one or more systems or workstations, or may be part of a larger system or workstation (e.g., speech synthesis system, text to speech system, etc.).

The system 202 receives input 212, which may include training data 214, denoted as $X_{TR}$, and runtime data 216, denoted as $X_{TE}$. The system 202 is trained using training date 214 during a training phase to predict prosody of runtime data 216 during a runtime phase. The training data $X_{TR}$ and runtime data $X_{TE}$ are preferably in the form of text-based features, such as, e.g., phonetic identity, syllable counts, and other features typically used for prosody prediction, and may be in the form of a vector. The input data may also be in other forms or configurations (e.g., a parse tree produced by a syntactical parser).

The parametric module 218 is trained using the raw inputs $X_{TR}$ to reproduce the targets $Y_{TR}$ in the training data. Preferably, the parametric module 218 includes an NN model, however other models may also be employed within the context of the present invention. The NN non-linearly transforms the inputs $X_{TR}$ by performing a series of n transformations to obtain targets $Y_{TR}$. In addition to serving as a predictive model, the NN can also be used as a (non-linear) feature extractor by tapping into the output just before the inputs $X_{TR}$ have been transformed by the n-th layer transformation (i.e., the n−1 layer). The n−1 level features are referred to as deep layer features z. These deep layer features z are the result of passing the raw numerical inputs through the first n−1 layers of the NN, where each layer computes a weighted sum of the preceding layer's outputs, followed by a non-linearity. It has been demonstrated that features extracted from the deepest layer of the network (i.e., one layer prior to the target) yielded consistently better results than features extracted from lower levels of processing. These deep layer features z are forwarded to the exemplar-based module 220.

The present invention makes use of recent techniques for NN training, in which a two-pass approach combines an underlying generative model, trained in an unsupervised manner, with standard supervised techniques for training the discriminative model. In the first, or pretraining, phase, all but the output layer of a deterministic, feed-forward NN are replaced with an undirected, probabilistic, generative model. Such a structure, known as a Deep Belief Network (DBN), is first trained in an unsupervised manner (i.e., ignoring the network targets). After the weights of this structure have been learned, they are used to initialize the feed-forward structure which, with the output targets now restored, is further trained using back-propagation to maximize the loss function on the output layer (in this case, mean squared error) between the targets and the predictions.

The training of the DBN is performed layer-wise by learning the weights between each pair of layers at a time. Each undirected bipartite graph structure resulting from this decomposition is known as a Restricted Bolzmann Machine and can be trained fairly efficiently using the gradient-descent with a Contrastive Divergence method. Given that all inputs to the model have been encoded as Boolean indicators, the RBM only contains connections between Bernoulli-distributed variables.

It should be understood that alternative NN architectures may also be employed to construct a parametric model that could be used as a feature extractor to generate suitable representations for the exemplar-based model 220. For example, in one embodiment, the set of training targets $Y_{TR}$ could be augmented with additional complementary correlated targets to bias the training of the NN to learn the main and complementary tasks jointly. For instance, when learning to predict F0 contours, the target vector could be augmented with duration targets since there is a known interaction between duration and intonation that the network could exploit to extract better features.

In another embodiment, an auto-encoder (AE) architecture could be used to generate bottleneck features for the exemplar-based model 220. In the AE architecture, the outputs are forced to match the inputs $X_{TR}$, and the network is trained to reproduce the inputs at the outputs after going through a pinched or bottleneck layer of reduced dimensionality. Because of the non-linear network of the structure, this architecture manages to extract non-linear, lower-dimensional features from the inputs that the exemplar-based model 220 can then better exploit when assessing relevance.

In other embodiments, dynamic versions, such as a recurrent NN (where the inner hidden-layers have self-connections across time), may be employed. This temporal architecture could be trained with the basic targets $Y_{TR}$, or can be further combined with schemes already discussed above. Other forms of parametric model 218 are also contemplated.

The exemplar-based module 220 receives transformed raw inputs $X_{TR}$ and targets $Y(k)_{TR}$ for each stream k of the target F0 vector. The transformed raw inputs $X_{TR}$ represent the raw inputs $X_{TR}$ being transformed up to the layer before the output (i.e., the deepest layer) of the parametric module 218 to provide deep layer features. Preferably, the exemplar-based module 220 includes a GP regression model; however, the exemplar-based module 220 may include any non-parametric model. The exemplar-based module 220 is configured to generate a database of exemplars. The exemplars in the database are paired with the deep layer features z from the parametric module 218. These augmented exemplars may be used to train the Gaussian process to adjust any hyperparameters $\theta(k)$ that the model might include. Hyperparameters referred to herein may refer to any free parameter that is part of the exemplar-based model (such as those indicated in Eqn. (8) below), and which need to be adjusted during the training phase to obtain good-quality predictions.

The NN of the parametric module 218 assumes the role of mapping a heterogeneous combination of categorical and numeric raw inputs into a continuous representation that can be used directly to score similarity among exemplars in the exemplar-based module 220. This approach further allows to automatically incorporate dimensionality reduction by simply constraining the number of nodes in the n-th layer (e.g., by imposing a bottleneck structure on the NN).

To keep the number of parameters in check, the NN is trained in a "context-independent" manner; that is, the training tokens consist of the pairs $\{x_{tr}, y_{tr}\}$. Context, however, can be easily incorporated in the GP regression of the exemplar-based model 220 by augmenting each deep layer feature z with a neighborhood of observations $\{[z_{t-M}^T, \ldots, z_t^T, \ldots z_{t+M}^T]^T, y_t\}$ when training the hyperparameters $\theta$ of the GP model. Although that increases the dimensionality of the input received by the GP, it does not increase the number of hyperparameters since GPs are considered with dimensionality-independent kernel functions. Once the exemplar database is formed, the hyperparameters $\theta$ (if any) of the GP are estimated. This completes the training phase of the model.

A GP is a collection of random variables, any finite collection of which have a jointly Gaussian distribution, and which can be completely specified by its input-dependent mean function m(x) and covariance function k(x,x'). The underlying samples of the GP is allowed to be corrupted by independent, identically distributed Gaussian noise $\epsilon \sim \mathcal{N}(0, \sigma_n^2)$, and assume a constant mean to arrive at the model:

$$y = f(x) + \epsilon \tag{1}$$

$$f(X) \sim \mathcal{N}(m,K) \tag{2}$$

$$K_{ij} = k(x_i, x_j) + \sigma_n^2 \delta_{ij} \tag{3}$$

Considering two sets of variables corresponding to the observations $Y_{TR}$ in a set of training cases and the underlying function values of a set of test cases $f_{TE}$, then it still holds that:

$$\begin{bmatrix} y_{TR} \\ f_{TE} \end{bmatrix} \sim N\left(m, \begin{bmatrix} k(X_{TR}, X_{TR}) + \sigma_n^2 I & K(X_{TR}, X_{TE}) \\ K(X_{TE}, X_{TR}) & K(X_{TE}, X_{TE}) \end{bmatrix}\right) \tag{4}$$

from which, after marginalization, the conditional distribution $p(f_{TE}|y_{TR})$ can be shown to follow:

$$f_{TE}|y_{TR} \sim \mathcal{N}(\bar{f}_{TE}, \text{cov}(f_{TE})) \tag{5}$$

$$\bar{f}_{TE} = m + \{K(X_{TE}, X_{TR}) \times [K(X_{TR}, X_{TR}) + \sigma_n^2 I]^{-1}(y_{TR} - m)\} \tag{6}$$

$$\text{cov}(f_{TE}) = K(X_{TE}, X_{TE}) - \{K(X_{TE}, X_{TR})[K(X_{TR}, X_{TR}) + \sigma_n^2 I]^{-1} \times K(X_{TR}, X_{TE})\} \tag{7}$$

Since the conditional is also a Gaussian, equations (6) and (7) provide the maximum a posteriori (MAP) estimate and error bars for a given set of test cases $X_{TE}$ based on the exemplar pairs $\{X_{TR}, Y_{TR}\}$. The computation of these equations involves evaluating (and inverting) matrices whose entries are determined by the choice of correlation function $k(x_i, x_j)$. To ensure positive definiteness, $k(\bullet, \bullet)$ must be a valid kernel (i.e., it can be represented as an inner product of functions). A simple squared exponential covariance function may be employed:

$$k(x_i, x_j) = \exp\left(-h \frac{\|x_i - x_j\|^2}{2\sigma_k^2}\right), \tag{8}$$

where h and $\sigma_k$, in addition to $\sigma_n$ (the noise-model variance), are hyperparameters of the GP ($\theta = [h, \sigma_k, \sigma_n]^T$). As variations in this hyperparameter set can lead to very different output processes, it is important for accurate prediction to properly estimate them from the training set. This can be done by maximizing the marginal likelihood of the training observations (the evident function), which can be shown to be given by:

$$\log p(y_{TR}|x_{TR}, \theta) = -\tfrac{1}{2} y_{TR}^T K_{TR}^{-1} Y_{TR} - \tfrac{1}{2} \log|K_{TR}| - n/2 \log(2\pi) \tag{9}$$

$$K_{TR} = K(X_{TR}, X_{TR}) + \sigma_n^2 I \tag{10}$$

It should be clear that, though the test inputs are arranged in a pre-defined sequence at runtime, the collection of random variables that define this model do not have a temporal arrangement among them (i.e., it is not a sequential model). There is no implicit notion of time beyond what is addressed by the augmented input context. The training exemplars contribute to the prediction based on their correlation to the test exemplars, as measured in input space (i.e., the text-based features, not time). The dynamic evolution is addressed by including the delta sequences and using these within a known parameter-generation methods.

At runtime, the system 202 employs the trained hybrid model, which includes parametric module 218 and exemplar-based module 220. Runtime data $X_{TE}$ are processed by the first n layers of the NN of the parametric model 218 to extract the runtime deep layer features z. Then, the GP of the exemplar-based module 220 generates its prediction as a function of these runtime deep layer features as compared with the training deep layer features stored in the exemplar database. The GP implicitly assesses relevance via a kernel functions (such as, e.g., the squared-exponential shown in equation 8, etc.) evaluated between an input test case and each store input exemplar. The F0 contour prediction 224 may be included as output 222.

The hybrid model may be built in a genre-specific mode or a multi-genre model. Genres may correspond to groupings of texts that can have a specific effect on the speaking style or prosodic delivery (for instance, e.g., the style of reading a literary narrative compared to the style of spontaneous sports broadcasting). In a genre-specific mode, a hybrid model is built for each genre or style of interest. In a multi-genre mode, data from all genres/styles of interest are pooled to build a single hybrid model. The single hybrid model includes a genre-indicator features that can be used to trigger the appropriate deep layer features.

The present invention was evaluated by implementing an architecture to predict F0 contours for expressive speech synthesis. Since the model consists of only single-output GPs in the exemplary embodiment, 3 independent GP models are learned in the training phase, one associated with each stream k of the target F0 vector: log F0, delta sequences, and delta-delta sequences. The main log F0 stream represents the pitch contour directly, whereas the 2 delta sequences encode the variation (difference and acceleration) of the F0 temporal sequence over time. These sequences represent state-level mean statistics of the respective frame-level curves, where the state segmentation has been previously generated by forced alignment, with 3-state hidden Markov models (HMM), between the acoustic waveforms and the phonetic transcripts (i.e., the observations correspond to roughly ⅓ of a phone). At runtime, all that is needed to generate the predictions from the inputs are the transforms associated with the n-th layer ($(T=T_1 \circ T_2 \ldots \circ T_n$, where $T_j=g(W_j x_j)$, $W_j$ are the weights of the j-th layer, $x_j$ is the inputs arriving at that layer, and $g(\bullet)$ is the logistic function), the GP model's hyperparameters $\theta(k)$ for each stream k, and the exemplars in the training database.

Figure 3:
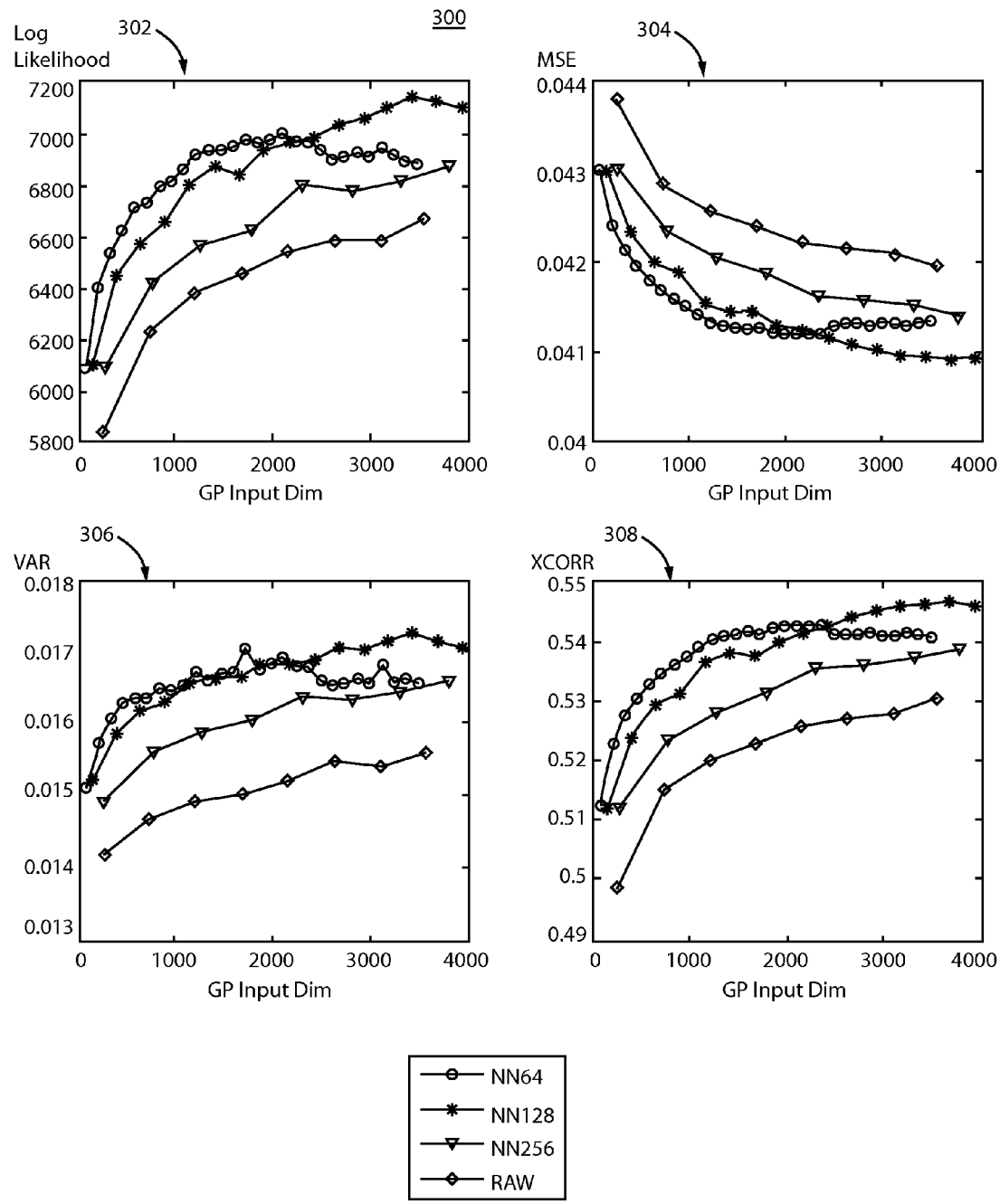
FIG. 3 shows graphs illustrating performance of the hybrid predictive model, in accordance with one illustrative embodiment.

Referring now to FIG. 3, graphs 300 depicting objective metrics for an independent development set (i.e., not used for training) after NN deep layer features for 3 different structures have been modeled with a GP. The NN is shown in the graphs 300 having three different output layer sizes: 64, 128 and 256. The graphs 300 also show raw data with no NN processing before being modeled with the GP. The objective metrics may include the log likelihood (LL), mean-square error (MSE), variance (VAR), cross-correlation (XCORR), which are shown in graphs 302, 304, 306 and 308, respectively. Other objective metrics may also be employed. The x-axis of the graphs 300 shows the input dimensionality to the GP as a result of adding additional windows of context.

The graphs 300 demonstrate the following. The metrics improve (i.e., MSE decreases, while LL, VAR, and XCORR increase) when the hybrid model is used instead of directly using the GP on the raw input features (i.e., the hybrid model improves over bypassing the parametric model). The metrics improve when the hybrid model is used instead of only the NN model (i.e., the hybrid model improves over bypassing the exemplar-based model). The additional use of a large context window helps improve the metrics, something which is readily incorporated by an exemplar based model whose number of hyperparameters is independent of the input dimensionality.

Referring now to FIG. 4, a block/flow diagram showing a method for prosody prediction 400 is depicted in accordance with one illustrative embodiment. In block 402, a hybrid model for prosody prediction is trained. The hybrid model includes a parametric model and an exemplar-based model. In one embodiment, the parametric model includes an NN and the exemplar-based model includes a GP.

In block 404, the parametric model is trained to transform training data to training targets. In one embodiment, training the parametric model may include replacing all but the output layer of the parametric model with a Deep Belief Network, training the DBN in an unsupervised manor to learn weights, and further training the DBN with back-propagation using the outputs. In block 406, deep layer features are extracted from the training data using the parametric model. Deep layer features are data transformed up to layer in the parametric model before the output layer. In block 408, the exemplar-based model is trained to determine exemplars from the training data. In block 410, the exemplars are paired with the deep layer features of the training data and stored in an exemplar database. In one embodiment, dimensionality can be reduced by constraining the number of nodes in the deepest layer in the parametric model before the output layer.

In block 412, the trained hybrid model may be used to predict prosody of runtime data. In block 414, the runtime data is processed using the parametric model to determine deep layer features of the runtime data. This may include transforming the runtime data up to the layer before the output of the parametric model. In block 416, the deep layer features of the runtime data are compared with the deep layer features of the training data, which is paired with exemplars of the training data, using the exemplar-based model to predict prosody (e.g., F0 contour) of the runtime data.

Having described preferred embodiments of a system and method F0 contour prediction with a deep belief network-Gaussian process hybrid model (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for prosody prediction, comprising:
extracting features from runtime data using a parametric model;
comparing the features from runtime data with features from training data using an exemplar-based model to predict prosody of the runtime data, the features from the training data being paired with exemplars from the training data and stored on a computer readable storage medium; and
synthesizing speech, by a speech synthesizer, using the predicted prosody,
wherein the parametric model includes a plurality of layers, and the features include deep layer features that, in turn, include features after data has been transformed up to a layer of the parametric model before an output layer, and
wherein a hybrid model including the parametric model and the exemplar-based model is built for each genre of interest.

2. The method as recited in claim 1, wherein the parametric model includes a neural network model and the exemplar-based model includes a Gaussian Process model.

3. The method as recited in claim 1, wherein the features include deep layer features.

4. The method as recited in claim 1, further comprising training the parametric model to transform the training data to reproduce training targets.

5. The method as recited in claim 1, further comprising training the exemplar-based model to determine exemplars from the training data.

6. The method as recited in claim 1, further comprising constraining a number of nodes in a deepest layer of the parametric model before an output layer to reduce dimensionality.

7. The method as recited in claim 1, wherein a hybrid model including the parametric model and the exemplar-based model is built for all genres of interest by pooling data from the genres of interest.

8. The method as recited in claim 7, wherein the hybrid model includes a genre-indictor feature to trigger appropriate deep layer features.

9. The method as recited in claim 1, wherein the parametric model is trained to apply transformations to training data to reproduce a training target, and the features are extracted one layer prior to the training target.

10. The method as recited in claim 1, wherein the features extracted one layer prior to the training target are the features with training data that are compared to the features from runtime data to predict the prosody of the runtime data.

11. The method as recited in claim 1, wherein exemplars of the exemplar-based model are determined from the transformed training data and the training target, and the exemplars are paired with the extracted features for comparison to the features from the runtime data.

12. The method of claim 1, wherein the plurality of layers include n transforming layers, wherein each of the n transforming layers computes a weighted sum of outputs of a preceding layer, followed by a non-linearity.

13. The method of claim 1, wherein the plurality of layers include n transforming layers, and the deep layer features, in turn, include the features after the data has been transformed up to an n−1 transforming layer of the parametric model.

14. The method of claim 13, wherein raw numerical inputs are passed through the first n−1 transforming layers of the parametric model.

15. The method of claim 1, wherein the deep layer features comprise prosody prediction features.

16. The method of claim 15, wherein the prosody prediction features comprise phonetic identity and syllable count.

17. A method for prosody prediction, comprising:
extracting features from runtime data using a parametric model;
comparing the features from runtime data with features from training data using an exemplar-based model to predict prosody of the runtime data, the features from the training data being paired with exemplars from the training data and stored on a computer readable storage medium; and
synthesizing speech, by a speech synthesizer, using the predicted prosody,
wherein the parametric model includes a plurality of layers, and the features include deep layer features that, in turn, include features after data has been transformed up to a layer of the parametric model before an output layer, and
wherein a hybrid model including the parametric model and the exemplar-based model is built for all genres of interest by pooling data from hybrid models built for each of two or more genres of interest.

* * * * *